US006981244B1

(12) United States Patent
Kathail et al.

(10) Patent No.: US 6,981,244 B1
(45) Date of Patent: Dec. 27, 2005

(54) SYSTEM AND METHOD FOR INHERITING MEMORY MANAGEMENT POLICIES IN A DATA PROCESSING SYSTEMS

(75) Inventors: Pradeep K. Kathail, Sunnyvale, CA (US); Haresh Kheskani, Saratoga, CA (US); Srinivas Podila, Cupertino, CA (US); Sebastien Marineau-Mes, Hull (CA)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 09/657,761

(22) Filed: Sep. 8, 2000

(51) Int. Cl.[7] .................................................. G06F 9/44
(52) U.S. Cl. ....................................................... 717/124
(58) Field of Search ................................ 717/124, 133, 717/141; 711/170

(56) References Cited

U.S. PATENT DOCUMENTS 4,104,718 A * 8/1978 Poublan et al. ................ 707/8
4,590,555 A * 5/1986 Bourrez ...................... 709/103
5,027,271 A * 6/1991 Curley et al. ............... 710/240
5,230,065 A * 7/1993 Curley et al. ............... 709/226
5,680,623 A * 10/1997 Onuma ....................... 717/162
5,784,697 A * 7/1998 Funk et al. ................. 711/170
5,805,890 A * 9/1998 Simons et al. .............. 717/124
5,838,994 A * 11/1998 Valizadeh .................... 710/56
5,978,902 A * 11/1999 Mann ......................... 712/227
5,983,215 A * 11/1999 Ross et al. ..................... 707/2
6,151,688 A * 11/2000 Wipfel et al. ................. 714/48
6,243,860 B1 * 6/2001 Holland ...................... 717/141
6,336,195 B1 * 1/2002 Shen et al. ................... 714/34
6,345,383 B1 * 2/2002 Ueki .......................... 717/124

* cited by examiner

*Primary Examiner*—Wei Y. Zhen
*Assistant Examiner*—Kuo-Liang J. Tang

(57) ABSTRACT

An operating system architecture and method which provides for transparent inheritance of memory management policies in data processing systems and enhanced memory management is disclosed. The operating system provides for a special "debug" process flag to be associated with debug and device management processes. When a source process transmits a message to a destination process, the operating system determines whether the source process is a debug process (i.e., whether the source process contains a debug process flag indicator associated therewith). If the source process is a debug process, a debug process flag indicator is also associated with the destination process. The operating system also reserves a portion of the device's memory (a reserve memory pool) which is only allocated to special "debug" process when the non-reserved pool of memory is depleted.

16 Claims, 4 Drawing Sheets

SYSTEM AND METHOD FOR INHERITING MEMORY MANAGEMENT POLICIES IN A DATA PROCESSING SYSTEMS

BACKGROUND OF THE INVENTION

1. Field of the Invention

This invention pertains generally to memory management systems. More particularly, the invention is an operating system and method for inheriting memory management policies in computers, embedded systems and other data processing systems and which further provides enhanced memory management.

2. The Prior Art

In embedded systems and other data processing systems and computers, operating systems provide the basic command function set for proper operation of the particular device. In routers, for example, router operating systems (ROS) provide the basic command functions for the router as well as various subsystem components which provide specific functions or routines provided by the router.

To provide desired high availability and serviceabilty features, embedded systems are increasingly using micro kernels in operating system designs. These micro kernels typically provide virtual memory support without any paging or backing storage support. That is, every process has its own memory space, and use of memory in the system is limited to the physical memory installed in the system. As a consequence, these systems may encounter low memory situations during operation, particularly on busy systems and in busy environments. For example, memory usage and consumption to accommodate a large number of routing tables in a router may create low memory situations.

In low memory situations, management and debugging of the system may become problematic as is known in the art. For example, where the kernel dedicates the entire physical memory space of the system for general application use, debugging and/or management of the system may be cumbersome if there is insufficient memory to spawn the processes required for debugging. Under such low memory conditions, the user of the system will typically be required to terminate (or "kill") one or more other processes to free sufficient memory space for debugging.

Some systems have partially addressed this problem by reserving a pool of memory and providing a separate API (application program interface) to allocate from this "reserved" pool. When the system runs out of memory, debug and management entities allocate resources from the reserved pool. However, in message-based system, often debug and management entities spawn other processes and/or require libraries (i.e., support entities) which are not debug or management entities and which cannot allocate from the reserve pool of memory. Accordingly, debug and/or management processes may fail. In this scenario, the user of the system will typically be required to either terminate other processes or make special calls to allocate memory for the support entities.

Traditional desktop operating systems (e.g., UNIX™ or Windows®) rely on "backing" storage to create physical memory in the system as is known in the art. Most of these systems do not handle the condition where the system runs out of backing storage (i.e., when both physically installed memory and the backing storage is exhausted). The same problems outlined above for embedded systems become realized in systems with backing storage when the backing storage of such systems is depleted.

Accordingly, there is a need for an operating system architecture and method which provides for transparent inheritance of memory management policies in data processing systems and enhanced memory management. The present invention satisfies these needs, as well as others, and generally overcomes the deficiencies found in the background art.

BRIEF DESCRIPTION OF THE INVENTION

The present invention is an operating system and method for execution and operation within a data processing system. The operating system may be used within a conventional computer device or an embedded device as described herein. According to one aspect of the invention, the operating system provides for a special "debug" process flag to be associated with debug and device management processes. These "debug" processes are typically invoked by a user of the device, but may also be triggered automatically when errors occur. According to a first embodiment of the invention, a debug process flag may be associated with a process by setting a debug bit flag indicator within the process's structure.

According to another aspect of the invention, the operating system allocates the memory of the device into a main memory pool and a reserve memory pool. During operation of the device, processes are allocated space from the main memory pool. That is, processes (including "debug" processes) are allocated memory from the main memory pool. Under low memory conditions, when the main memory pool is depleted, "debug" processes may be allocated memory from the reserve memory pool. Non-debug processes (i.e., processes not having a debug process flag associated therewith), however, are denied allocation from the reserve memory pool. Under this arrangement, a user of the device is able to perform debug and management of the device, despite the low memory conditions.

According to yet another aspect of the present invention, the operating system provides message transferring services. When a source process transmits a message to a destination process, the operating system determines whether the source process is a debug process (i.e., whether the source process contains a debug process flag indicator associated therewith). If the source process is a debug process, a debug process flag indicator is also associated with the destination process. Accordingly, other support processes and libraries which are invoked by a source debug process are considered "debug" processes for purposes of memory allocation from the reserve pool. In this arrangement, debugging and management may be carried out by the user of the system in a transparent manner (i.e., without requiring special memory allocation techniques and procedures). The "debug" process flag policy is "inherited" from source process to destination process, and memory allocation may be carried out by inspecting processes for the debug process flag.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
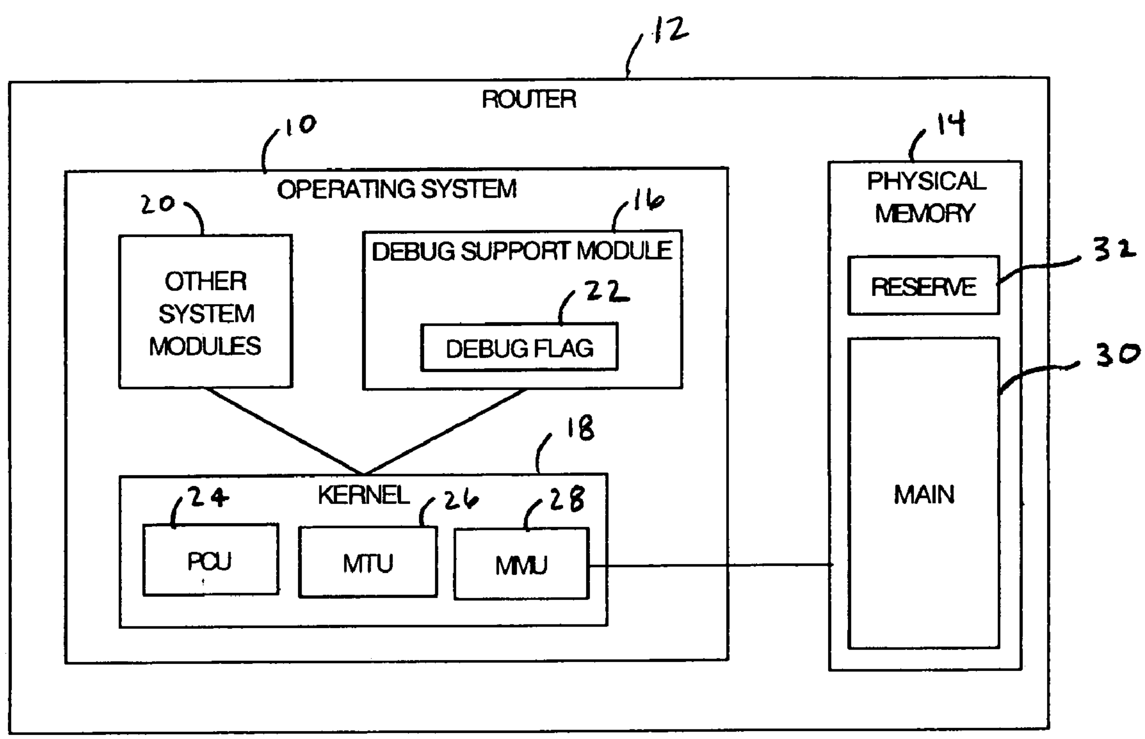
FIG. 1 is a functional block diagram of an illustrative operating system architecture in accordance with the present invention.
Figure 2:
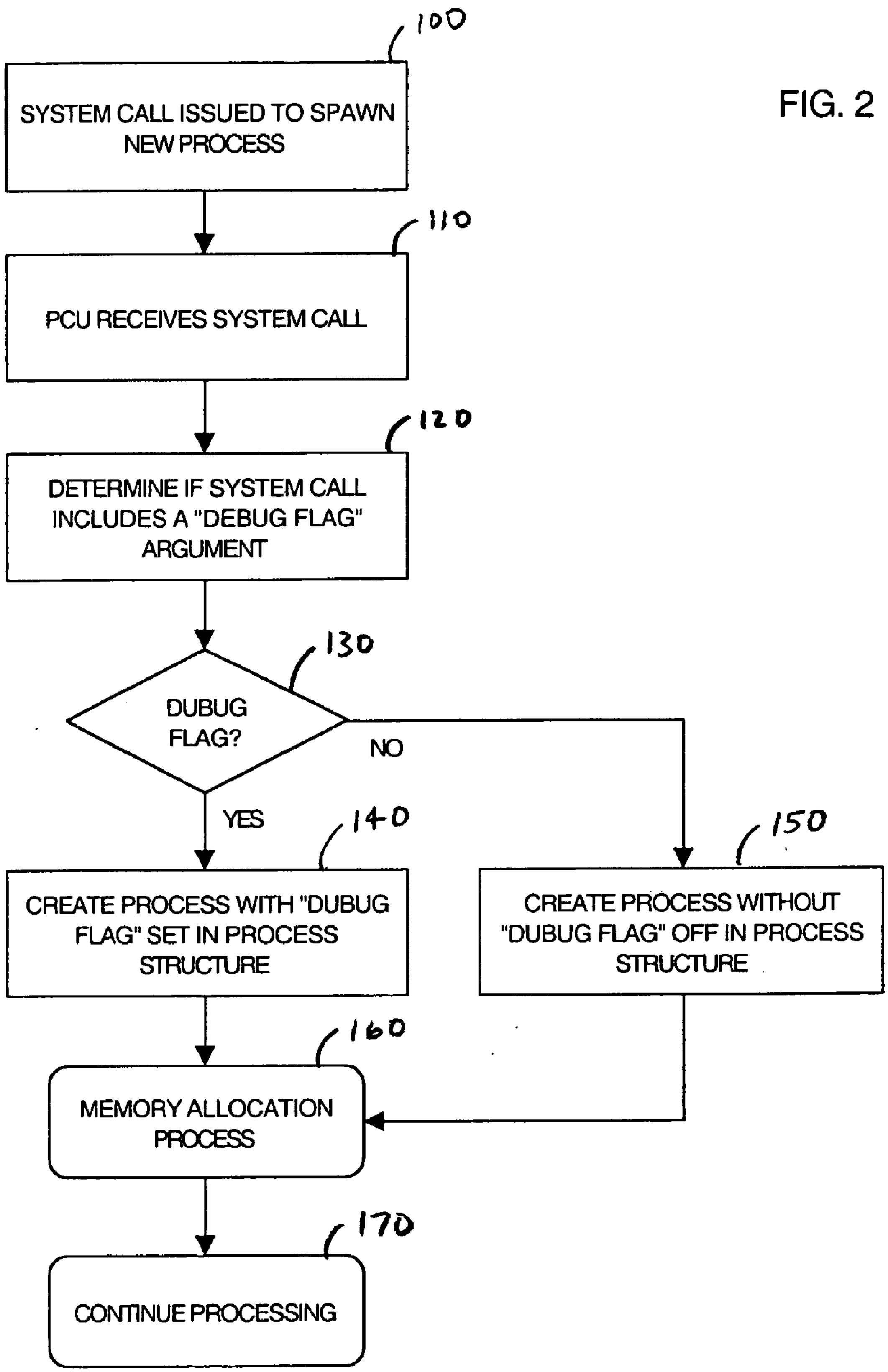
FIG. 2 is a logical flow diagram depicting the process associated with a process creation unit in accordance with the present invention.
Figure 3:
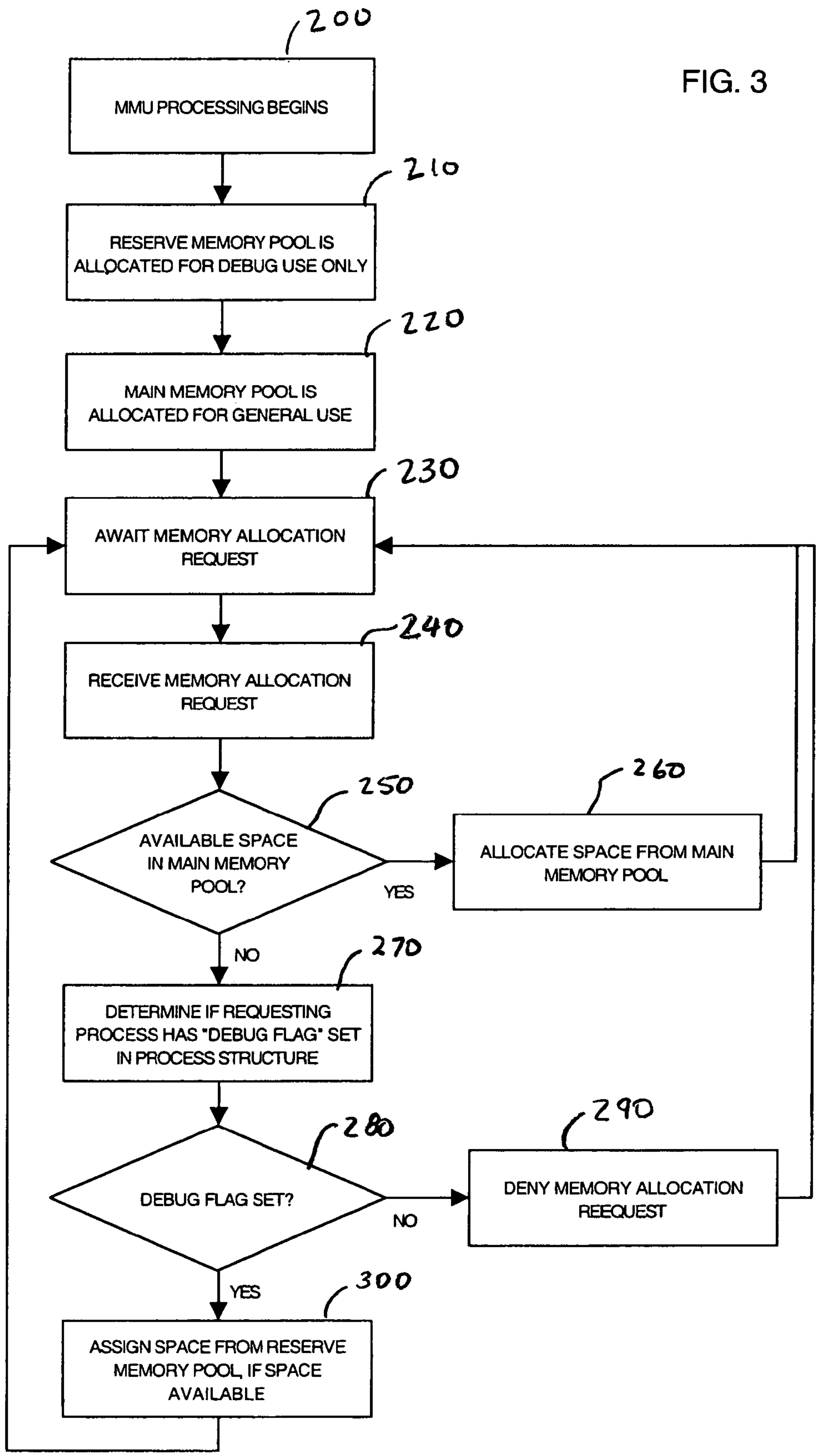
FIG. 3 is a logical flow diagram depicting the process associated with a memory management unit in accordance with the present invention.
Figure 4:
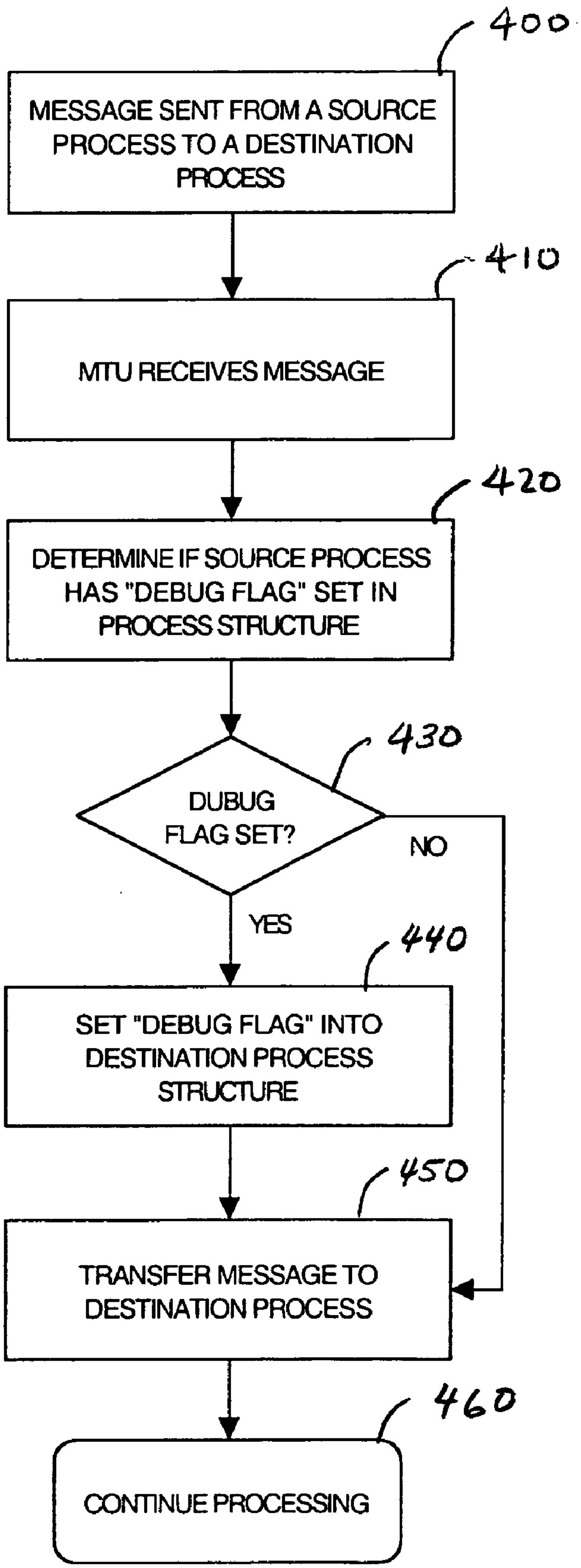
FIG. 4 is a logical flow diagram depicting the process associated with a messaging transfer unit in accordance with the present invention.

Referring more specifically to the drawings, for illustrative purposes the present invention is embodied in the apparatus shown FIG. 1 and the method outlined in FIG. 2 through FIG. 4. It will be appreciated that the apparatus may vary as to configuration and as to details of the parts, and that the method may vary as to details and the order of the acts, without departing from the basic concepts as disclosed herein. The invention is disclosed generally in terms of an operating system and method for use with an embedded device, such as a router, although numerous other uses for the invention will suggest themselves to persons of ordinary skill in the art, including use with a convention computer or other data processing device.

Referring first to FIG. 1, there is shown an illustrative operating system 10 operating within a router 12. The operating system 10 may further be used with other conventional data processing devices, computers and embedded devices as would readily be apparent to those skilled in the art having the benefit of this disclosure.

Router 12 includes conventional hardware components (not shown) including a CPU (central processing unit) which executes the operating system 10, input/output interfaces and devices, and memory/storage facilities. The router's physical memory is generally represented by memory block 14, which is operatively coupled for communication with and managed by the operating system 10. It is noted that although router 12 is described herein without paging or backing storage support, the present invention may be used for operation in devices having backing storage support (such as traditional desktop computers), in which case the operation system 10 further manages memory allocation on the backing storage as well as the physically installed memory 14 as described herein.

The operation system 10 comprises a debug support module 16 operatively coupled for communication to a kernel module 18. Other system modules (generally designated as 20) are also provided for supporting conventional operating system functions and are operatively coupled for communication to the kernel module 18. Examples of other system modules 20 include library (e.g., dynamic link libraries) support modules, user interface support modules and hardware support modules, among others.

The debug support module 16 provides debug and management functions for the router 12. A user of the router 12 may, for example, issue debug or management commands to troubleshoot problems or errors associated with the router 12. Such debug or management commands are typically issued by a user directly, such as via a command line instructions. Alternatively, although not preferred, the debug commands may also be issued automatically by debugging or error-trapping utilities installed on the router 12.

According to the invention, such debug and management commands are associated with a "debug flag" 22 to identify processes associated with the debug command as special "debug" processes. That is, when a debug command (or system call) is issued to the kernel 18 to spawn an appropriate process, the debug command (or system call) will also indicate the "debug flag" 22 to thereby identify the debug command as a special "debug" process. As described in further detail below, memory management and message transfer management are carried out, in part, according to this debug flag indicator.

The kernel 18, which carries out core operating system functions, comprises a PCU (process creation unit) 24, a MTU (messaging transfer unit) 26 and a MMU (memory management unit) 28.

The PCU 24 is operatively coupled for communication to the other modules 16, 20 of the operating system. The PCU 24 is configured to spawn a new process when a spawn request is received by the kernel 18. As is known in the art, these spawn requests will normally be communicated by an executive (exec) module (not shown) which is interfaced between the kernel and other applications (such as a command line interface to the user) running on the router 12. For example, the user may issue a "show processes" command to determine the currently running processes. In response to this user command, the exec will make a system call to the kernel 18 to spawn a new process to carry out the user command.

As noted above, commands associated with the debug support module 16 have an associated debug flag 22. During operation, when these debug commands are issued, the system call to the kernel will indicate the debug flag 22, normally as an operand or argument. The PCU 24 receives the system call to spawn a new process. The PCU 24 also determines whether the debug flag 22 is indicated by the system call, normally by inspecting for the debug flag 22 in the operand. If the PCU 24 determines that a debug flag 22 is associated with the system call to spawn a new process, the PCU 24 will create a process with a debug flag indicator associated with the process. Typically, the PCU 24 will set a debug flag bit in the process structure to indicate whether or not a debug flag indicator is associated with the process. When the PCU 24 determines that that a debug flag 22 is not associated with the system call, the PCU 24 will create the process with the debug flag indicator turned "off" or not associated with the process. Once created, the process then performs its operation. The method and operation of the PCU 24 is described in further detail below in conjunction with FIG. 2.

The MTU 26 provides support for inheriting memory management policies from a source process to a destination process or module. As described above, the processes associated with debug and management commands will have a debug flag indicator set to identify the processes as "special". However, in certain cases a first process may require a second process or a library (e.g., DLL (dynamic link library)). For example, a debug process (e.g., show bgp routes) may require information from another "non-debug" process (e.g., bgp) to carry out its operation (e.g., display bgp routes). In the prior art, the destination process (or library) may fail because the memory allocation for "non-debug" process (e.g., bgp) would fail under low-memory conditions.

According to the present invention, the memory management policies from a first source process is inherited by a destination process or library called by the first source process. The MTU 26 which handles messaging between processes, further determines whether a source process has a debug flag indicator set, and if a debug flag indicator is set, the MTU 26 sets the debug flag indicator in the destination process or library. Thus, the destination process or library is able to carry out its task as a "special" process, when the requesting process is also a "special" process. Accordingly, the destination process is able to request allocation of memory according to the source process, thereby inheriting the memory management policy of the source process. It is noted that if a source process is not a "special" process, the destination process does not inherit the memory management policy of the source if the destination process is a "special" debug process. The method and operation of the MTU 26 is described in further detail below in conjunction with FIG. 4.

The MMU 28 provides memory management and allocation of the physical memory 14 of the router 12. As noted above, the MMU 28 may also provide memory management and allocation for backing storage for devices supporting backing storage in substantially the same manner as described herein for physical memory 14.

Upon startup, the MMU 28 allocates the memory 14 into a main memory pool 30 and a reserve memory pool 32. The size of the size of the reserve memory pool 32 may be chosen arbitrarily or may be user-defined. In general, the reserve memory pool 32 will allocate sufficient memory to allow debug processes (as well as support processes and libraries) to operate.

In general, the reserve memory pool 32 is not used for allocation unless the main memory pool 30 has been depleted to the point where memory allocation cannot be made from the main pool 30. That is, in general the MMU 28 allocates memory for processes (both "special" debug processes and non-debug processes) from the main pool 30. Under low memory conditions (i.e., where main memory pool 30 has been depleted to the point where memory allocation cannot be made from the main pool 30), the MMU 28 may allocate memory to "special" debug processes from the reserve pool 32. According to the arrangement described above, where the debug flag indicator is defined in the process structure of the process, the MMU 28 inspects the process structure to determine whether the debug flag indicator is set ("on"). The MMU 28 then allocates space from the reserve pool 32 if the process has the debug flag indicator set. Because other processes or libraries may inherit the debug flag indicator of a special debug process, these other processes and libraries are also allocated space from the reserve pool 32. The method and operation of the MMU 28 is described in further detail below in conjunction with FIG. 3.

The method and operation of invention will be more fully understood with reference to the logical flow diagrams of FIG. 2 through FIG. 4, as well as FIG. 1. The order of actions as shown in FIG. 2 through FIG. 4 and described below is only exemplary, and should not be considered limiting.

FIG. 2 is a logical flow diagram depicting the process associated with the PCU 24 in accordance with the present invention.

At box 100, a system call to the kernel 18 is issued to spawn a new process. This system call, while normally issued by the exec, originates from a command given by one the modules 16, 20 of the operating system 10. As described above, commands associated with the debug support module 16 (i.e., debug and management commands) will indicate a debug flag in the operand of the system call to the kernel. Box 110 is then carried out.

At box 110, the PCU 24 receives the system call to spawn a new process for processing. Box 120 is then carried out.

At box 120, the PCU 24 determines whether the system call to spawn a new process includes a debug flag operand (or argument). Diamond 130 is then carried out.

At diamond 130, if the PCU 24 determines that the system call to spawn a new process includes a debug flag operand, box 140 is then carried out. Otherwise, box 150 is then carried out.

At box 140, the PCU 24 spawns a new process in accordance with the system call and sets (or embeds) a debug flag indicator within the process structure of the new process. This debug flag indicator is used for determining whether the process is a special debug process by the MMU 28 for memory allocation. The debug flag indicator is also inherited (or embedded) into other processes or libraries which are invoked by the process as described above in conjunction with the operation of the MTU 26. Process 160 is then carried out.

At box 150, the PCU 24 spawns a new process in accordance with the system call sets the debug flag indicator to "off" within the process structure of the new process. When set to "off" the debug flag indictor identifies the process as a non-debug process. Process 160 is then carried out.

At process 160, the process allocates memory for operation. This memory allocation process is carried out by the MMU 28, as described above. This process is also described in further detail below in conjunction with FIG. 3. After memory allocation, process 170 is carried out.

At process 170, the process carries out it operation. If memory allocation from process 160 was unsuccessful, the process normally terminates.

FIG. 3 is a logical flow diagram depicting the process associated with the MMU 28 in accordance with the present invention. This process is carried out upon startup of the router device 12. Processes 230 through 300 are carried out in conjunction with box 160 of FIG. 2.

At box 200, MMU 28 processing begins. This is normally carried out in conjunction with the startup of the router 12 and the operating system 10. During this startup process, various diagnostics are performed, among other things. Box 210 is then carried out.

At box 210, the MMU 28 allocates a portion of the physical memory 14 into a reserve memory pool 32. As noted above, the size of the reserve memory pool 32 may be chosen arbitrarily or may be user-defined. In general, the size of the reserve memory pool 32 will allocate sufficient memory to allow debug processes (as well as support processes and libraries) to operate. Box 220 is then carried out.

At box 220, the MMU 28 allocates the remaining unallocated portion of the memory 14 into a main memory pool 30. The main memory pool 30 is allocated for general use as well as for debug and management use. The reserved memory pool 32 is reserved for use with debug and management use during low memory conditions. Box 230 is then carried out.

At box 230, the MMU 28 awaits for a memory allocation request. When such a memory allocation request is received box, 240 is then carried out.

At box 240, the MMU 28 receives the memory allocation request and determines the size of memory required by the allocation request. Diamond 250 is then carried out.

At diamond 250, the MMU 28 determines whether there is sufficient space in the main memory pool 30 to accommodate the current memory allocation request. If there is sufficient space in the main pool 30 for the current memory allocation request, box 260 is then carried out. Otherwise, box 270 is carried out.

At box 260, the MMU 28 allocates space from the main memory pool 30 to the requesting process. Box 230 is then carried out.

At box 270, the MMU 28 has determined that there is insufficient space in the main memory pool 30 to accommodate the current memory allocation request. The MMU 28 then determines whether the requesting process has a debug flag indicator set. As described above, the debug flag indicator is normally set in the process structure. The debug flag is set for processes (and libraries) associated with debug or management commands, and not set (or "off") for non-debug related commands. Diamond 280 is then carried out.

At diamond 280, if the debug flag is set in the requesting process, box 300 is then carried out. Otherwise, the box 290 is carried out.

At box 290, the memory allocation request is denied and then box 230 is repeated.

At box 300, the MMU 28 allocates space to the requesting process from the reserve memory pool 32. There may be cases where the reserve memory pool 32 is also exhausted. In this case, the memory allocation is denied. Box 230 is then repeated to process further additional memory allocation requests.

FIG. 4 is a logical flow diagram depicting the process associated with the MTU 26 in accordance with the present invention. As described above, MTU 26 handles messaging and interoperation between processes. Although the process described herein relates to messaging between a first process to a second process, an analogous process is also carried when a first process loads or invokes a library file (e.g., DLL).

At box 400, a message is sent from a source process to a destination process. For example, a first process may request information from a second process to carry out its task. Box 410 is then carried out.

At box 410, the MTU 26 receives the message for processing. Box 420 is then carried out.

At box 420, the MTU 26 determines whether the source process is associated with a debug flag. In this way the MTU 26 inspects the process structure of the source process to determine if a debug flag is set or otherwise indicated. Diamond 430 is then carried out.

At diamond 430, if the debug flag is set in the source process, box 440 is then carried out. Otherwise box 450 is then carried out.

At box 440, the MTU 26 sets the debug flag in the destination process structure to thereby inherit the memory management policy from the source process to the destination process. The destination process is thus "special" for purposes of memory allocation and carrying out its process for the source process. Box 450 is then carried out.

At box 450, the message is then communicated to the destination process for further processing. Processing then continues as indicated by process 460.

Accordingly, it will be seen that this invention provides for an operating system architecture and method which provides for transparent inheritance of memory management policies in data processing systems and enhanced memory management. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a data processing system having a memory, an operating system executing within said data processing system comprising:

- a debug support module configured to associate a debug flag with debug commands issued within the data processing system; and
- a kernel module within said data processing system coupled for communication with said debug support module, said kernel module comprising:
  - a process creation unit configured to spawn special processes with a debug flag set for said issued debug commands associated with a debug flag issued wherein a debug flag indicates a process is a debug process with access to debug resources, and
  - a messaging transfer unit configured to transfer messages from a source process within said data processing system to a destination process within said data processing system, said message transfer unit further configured to set a debug flag for said destination process responsive to said source process having said debug flag set.

2. The operating system of claim 1, wherein said kernel further comprises a memory management unit configured to allocate the memory into a main memory pool and a reserve memory pool, said memory management unit further configured to allocate memory from said reserve memory pool only to said special processes having said debug flag set.

3. The operating system of claim 2, wherein said memory management unit is further configured to allocate memory to processes from said main memory pool, said memory management unit further configured to allocated memory to said special processes from said reserve memory pool responsive to said main memory pool is depleted and said debug flag of said special process is set.

4. The operating system of claim 1, wherein said process creation unit is further configured to spawn regular processes for commands issued which lack a debug flag, said regular processes lacking a debug flag indicator.

5. In a data processing system having a memory, a method for inheriting memory management policies from a source process to a destination process comprising:

- receiving a message for transfer from the source process to the destination process within said data processing system;
- determining if said source process is associated with a debug flag within said data processing system wherein a debug flag indicates that a process is a debug process with access to debug resources;
- associating a debug flag with said destination process responsive to said source process is associated with a debug flag within said data processing system; and
- communicating the message to the destination process within said data processing system.

6. The method of claim 5 further comprising:

determining if a debug command is issued within the data processing system;

spawning a new process associated with said debug command within said data processing system; and associating a debug flag with said new process to identify said new process as a debug process within said data processing system.

7. The method of claim 5, further comprising:

allocating the memory into a main memory pool and a reserve memory pool;

receiving a memory allocation request from a requesting process within said data processing system; and allocating memory to said requesting process from the main memory pool within said data processing system.

8. The method of claim 7, further comprising:

determining if said main memory pool is depleted within said data processing system;

determining whether said requesting process is associated with a debug flag within said data processing system; and allocating memory to said requesting process from the reserve memory pool responsive to said main memory pool being depleted and said requesting process being associated with a debug flag within said data processing system.

9. A program storage device readable by a machine, tangibly embodying a program of instructions executable by the machine to perform a method for inheriting memory management policies from a source process to a destination process in a data processing system having a memory, said method comprising:

receiving a message for transfer from the source process within said data processing system to the destination process within said data processing system;

determining if said source process is associated with a debug flag wherein a debug flag indicates that a process is a debug process with access to debug resources;

associating a debug flag into said destination process responsive to said source process being associated with a debug flag; and communicating the message to the destination process.

10. The program storage device of claim 9, said method further comprising:

determining if debug command is issued within the data processing system;

spawning a new process associated with the debug command within said data processing system; and associating a debug flag with said new process to identify said new process as a debug process.

11. The program storage device of claim 9, said method further comprising:

allocating the memory into a main memory pool and a reserve memory pool;

receiving a memory allocation request from a requesting process within said data processing system;

allocating memory to said requesting process form the main memory pool within said data processing system.

12. The program storage device of claim 11, said method further comprising:

determining if said main memory pool is depleted;

determining is said requesting process is associated with a debug flag; and allocating memory to said requesting process from the reserve memory pool responsive to said main memory pool being depleted and said requesting process being associated with a debug flag.

13. In a data processing system having a memory, an operating system executing within said data processing system comprising:

means for receiving a message for transfer from a source process within said data processing system to a destination process within said data processing system;

means for determining if said source process is associated with a debug flag wherein a debug flag indicates that a process is a debug process with access to debug resources;

means for associating a debug flag into said destination process within said data processing system responsive to said source process being associated with a debug flag; and means for communicating the message to the destination process within said data processing system.

14. The operating system of claim 13 further comprising:

means for determining if a debug command is issued within the data processing system;

means for spawning a new process within said data processing system associated with the debug command; and means for associating a debug flag with said new process to identify said new process as a debug process within said data processing system.

15. The operating system of claim 13, further comprising:

means for allocating the memory into a main memory pool and a reserve memory pool;

means for receiving a memory allocation request from a requesting process within said data processing system;

means for allocating memory to said requesting process from the main memory pool.

16. The operating system of claim 15, further comprising:

means for determining if said main memory pool is depleted;

means for determining is said requesting process is associated with a debug flag; and means for allocating memory to said requesting process from the reserve memory pool responsive to said main memory pool being depleted and said requesting process being associated with a debug flag.

* * * * *